US010435222B2

(12) United States Patent
Feder et al.

(10) Patent No.: US 10,435,222 B2
(45) Date of Patent: Oct. 8, 2019

(54) RECLOSABLY SEALED CUP, AND MULTI-LAYER WEB THEREFOR

(71) Applicant: TADBIK LTD., Petach Tikva (IL)

(72) Inventors: Eli Feder, Haifa (IL); Tomer Ben-Dov, Safed (IL)

(73) Assignee: TADBIK LTD., Petach Tikva (IL)

( * ) Notice: Subject to any disclaimer, the term of this patent is extended or adjusted under 35 U.S.C. 154(b) by 138 days.

(21) Appl. No.: 15/315,425

(22) PCT Filed: Jun. 8, 2015

(86) PCT No.: PCT/IB2015/054316
§ 371 (c)(1),
(2) Date: Dec. 1, 2016

(87) PCT Pub. No.: WO2015/189756
PCT Pub. Date: Dec. 17, 2015

(65) Prior Publication Data
US 2017/0197772 A1    Jul. 13, 2017

(30) Foreign Application Priority Data

Jun. 8, 2014  (GB) .................................. 1410148.9

(51) Int. Cl.
*B65D 77/20* (2006.01)
*B32B 38/00* (2006.01)
(Continued)

(52) U.S. Cl.
CPC ............ *B65D 77/2056* (2013.01); *A45F 3/16* (2013.01); *B29C 65/02* (2013.01);
(Continued)

(58) Field of Classification Search
CPC ............ B65D 77/2056; B65D 77/2096; B65D 2577/2091; B32B 7/12; B32B 38/0004;
(Continued)

(56) References Cited

U.S. PATENT DOCUMENTS 3,272,422 A    9/1966  Miller
4,498,588 A    2/1985  Scott
(Continued)

FOREIGN PATENT DOCUMENTS

GB    2537811 A  * 11/2016  ......... B65D 77/2096
WO    2008/086389 A1    7/2008

OTHER PUBLICATIONS

International Search Report for PCT/IB2015/054316, dated Oct. 21, 2015.
Written Opinion for PCT/IB2015/054316, dated Oct. 21, 2015.

*Primary Examiner* — Chun Hoi Cheung
*Assistant Examiner* — Brijesh V. Patel
(74) *Attorney, Agent, or Firm* — Marc Van Dyke; Fourth Dimension IP (57) ABSTRACT

A reclosably sealed cup including a cup having a sealing perimeter, a lid having a reclosable sealing arrangement, associated with the sealing perimeter. The lid is adapted to reclosably cover the cup, and the reclosable sealing arrangement adapted to reclosably seal the cup along the sealing perimeter. The reclosably sealed cup further includes an interfacial arrangement, interdisposed between the sealing perimeter and the reclosable sealing arrangement. The interfacial arrangement has a first surface disposed towards, and forming a base adhesive attachment with, the sealing perimeter, and a second surface, distal to the first surface, disposed towards the reclosable arrangement, and forming a reclosable adhesive attachment therewith.

19 Claims, 3 Drawing Sheets

(51) Int. Cl.
| | |
|---|---|
| *A45F 3/16* | (2006.01) |
| *B29C 65/02* | (2006.01) |
| *B29C 65/00* | (2006.01) |
| *B32B 7/12* | (2006.01) |
| *B32B 27/08* | (2006.01) |
| *B32B 27/28* | (2006.01) |
| *B32B 38/10* | (2006.01) |
| *B32B 37/12* | (2006.01) |
| *B32B 38/04* | (2006.01) |
| *B29K 683/00* | (2006.01) |
| *B29K 701/12* | (2006.01) |
| *B29L 31/00* | (2006.01) |

(52) U.S. Cl.
CPC .......... *B29C 66/53462* (2013.01); *B32B 7/12* (2013.01); *B32B 27/08* (2013.01); *B32B 27/283* (2013.01); *B32B 38/0004* (2013.01); *B32B 38/10* (2013.01); *B32B 38/145* (2013.01); *B65D 77/2096* (2013.01); *B29K 2683/00* (2013.01); *B29K 2701/12* (2013.01); *B29L 2031/7132* (2013.01); *B32B 37/12* (2013.01); *B32B 38/105* (2013.01); *B32B 2038/045* (2013.01); *B32B 2250/24* (2013.01); *B32B 2255/10* (2013.01); *B32B 2383/00* (2013.01); *B32B 2439/00* (2013.01); *B32B 2439/40* (2013.01); *B65D 2577/2091* (2013.01)

(58) Field of Classification Search
CPC ..... B32B 38/10; B32B 38/105; B32B 38/145; B32B 27/08; B32B 27/283; B32B 2255/10; B32B 2439/00; B32B 2439/40; B32B 2383/00; B32B 2250/24; B32B 2038/045; B29C 65/02; B29C 66/53462; B29K 2701/12; B29K 2683/00; A45F 3/16; B29L 2031/7132
USPC ..... 220/359.4, 270, 266, 265, 260; 156/247; 53/478, 477
See application file for complete search history.

(56) References Cited

U.S. PATENT DOCUMENTS

| | | | | |
|---|---|---|---|---|
| 4,673,601 | A * | 6/1987 | Lamping | B65D 75/52 220/266 |
| 5,039,001 | A * | 8/1991 | Kinigakis | B65D 77/225 220/359.3 |
| 5,092,469 | A * | 3/1992 | Takata | B32B 7/06 206/245 |
| 5,538,129 | A | 7/1996 | Chester et al. | |
| 6,026,953 | A | 2/2000 | Nakamura et al. | |
| 6,056,141 | A * | 5/2000 | Navarini | B32B 27/06 220/269 |
| 6,076,969 | A | 6/2000 | Jaisle et al. | |
| 6,182,850 | B1 * | 2/2001 | Marbler | B65D 77/225 220/359.3 |
| 6,302,290 | B1 * | 10/2001 | Engelaere | B29C 65/18 156/580 |
| 6,790,508 | B2 * | 9/2004 | Razeti | B32B 7/12 215/232 |
| 7,927,679 | B2 * | 4/2011 | Cruz | B32B 7/10 428/40.1 |
| 8,256,636 | B2 * | 9/2012 | Huffer | B65D 77/2036 220/266 |
| 8,541,081 | B1 * | 9/2013 | Ranganathan | B32B 7/12 426/123 |
| 8,746,490 | B2 * | 6/2014 | Huffer | B32B 27/32 156/247 |
| 2004/0118852 | A1 * | 6/2004 | Barmore | B65D 77/2044 220/359.2 |
| 2005/0276525 | A1 * | 12/2005 | Hebert | B29C 59/007 383/203 |
| 2006/0233987 | A1 * | 10/2006 | Mumpower | B32B 27/08 428/35.2 |
| 2008/0063821 | A1 * | 3/2008 | Galloway | B32B 7/06 428/35.2 |
| 2009/0178945 | A1 | 7/2009 | Moehlenbrock et al. | |
| 2009/0311454 | A1 * | 12/2009 | Stephens | B32B 7/12 428/35.7 |
| 2010/0172604 | A1 | 7/2010 | Andersson et al. | |
| 2012/0067896 | A1 * | 3/2012 | Daffner | B65D 77/2056 220/359.3 |
| 2013/0020328 | A1 * | 1/2013 | Duan | B65D 77/2056 220/359.3 |
| 2014/0252001 | A1 * | 9/2014 | Paolilli | B32B 7/02 220/359.3 |

* cited by examiner

RECLOSABLY SEALED CUP, AND MULTI-LAYER WEB THEREFOR

This application draws priority from U.K. Patent Application No. GB1410148.9, filed Jun. 8, 2014, and entitled "Multi-Layer Web", which application is hereby incorporated by reference, as if fully disclosed herein.

FIELD OF THE INVENTION

The present invention relates to multi-layer polymeric webs and, more particularly, to multi-layer polymeric webs for producing reclosably sealed cups.

SUMMARY OF THE INVENTION

According to some teachings of the present invention there is provided a reclosably sealed cup, including: (a) a cup having a sealing perimeter; (b) a lid having a reclosable sealing arrangement, associated with the sealing perimeter, the lid adapted to reclosably cover the cup, the reclosable sealing arrangement adapted to reclosably seal the cup along the sealing perimeter; and (c) an interfacial arrangement, interdisposed between the sealing perimeter and the reclosable sealing arrangement, the interfacial arrangement having a first surface disposed towards, and forming a base adhesive attachment with, the sealing perimeter, and a second surface, distal to the first surface, disposed towards the reclosable arrangement, and forming a reclosable adhesive attachment therewith, the base adhesive attachment exhibiting a base peeling force ($F_{base}$), the reclosable adhesive attachment exhibiting a reclosable peeling force ($F_{reclosable}$), a differential between the base peeling force and the reclosable peeling force ($F_{base}-F_{reclosable}$) being at least 0.1 N/inch.

According to some teachings of the present invention there is provided a reclosably sealed cup, including: (a) a cup having a sealing perimeter; (b) a lid having a reclosable sealing arrangement, associated with the sealing perimeter, the lid adapted to reclosably cover the cup, the reclosable sealing arrangement adapted to reclosably seal the cup along the sealing perimeter; and (c) an interfacial arrangement, interdisposed between the sealing perimeter and the reclosable sealing arrangement, the interfacial arrangement having a first surface disposed towards, and forming a base adhesive attachment with, the sealing perimeter, and a second surface, distal to the first surface, disposed towards the reclosable arrangement, and forming a reclosable adhesive attachment therewith, the reclosable sealing arrangement having an initial sealed mode, an open mode, and a resealed mode; the interfacial arrangement having a pre-determined weak region adapted such that in attaining the open mode from the initial sealed mode, the interfacial arrangement is broken along the pre-determined weak region, such that a first portion of the interfacial arrangement, exterior to the weak region, remains attached to the sealing perimeter via the base adhesive attachment; and such that a second portion of the interfacial arrangement, interior to the weak region, is released from the base adhesive attachment.

According to some teachings of the present invention there is provided a multi-layer web, including: (a) a first thermoplastic polymer layer; (b) a second thermoplastic polymer layer; and (c) an adhesive layer including a pressure-sensitive adhesive, interdisposed between the first and second thermoplastic polymer layers; the first thermoplastic polymer layer being laminated to a top surface of the second thermoplastic polymer layer by means of the pressure-sensitive adhesive; a bottom surface of the second thermoplastic polymer layer being adapted to be heat-welded to a thermoplastic sealing rim of a cup; the polymer layers, the pressure-sensitive adhesive, and the sealing perimeter selected and/or adapted to exhibit thermal stability at a temperature of at least 150° C.; the web including a plurality of substantially identical image sets, each image set of the image sets including: (i) at least one eyemark; and (ii) a cut curve forming a weakened region in the second thermoplastic polymer layer, the cut curve formed of at least one cut, the cut curve spanning an arc corresponding to an angle of at least 200°, the cut curve enclosing an enclosed portion of the image set; the image set having a width $W_{web}$ along a broad face of the web, and transverse to a long dimension of the web; the enclosed portion having a maximum width $W_{max}$ transverse to the long dimension; a dimensionless ratio of $W_{max}$ to $W_{web}$ being at least 0.2.

According to some teachings of the present invention there is provided a method of producing a reclosably sealed cup, the method including: (a) providing a multi-layer web; (b) pulling on the web to effect motion of the image sets along a longitudinal plane; (c) aligning a particular image set of the image sets, during the motion, with a particular cup body; (d) heat-sealing a sealing region within the particular image set to a sealing perimeter on the cup body; and (e) cutting off an excess portion of the particular image set around the sealing perimeter.

According to some teachings of the present invention there is provided a method of producing a multi-layer web, substantially as described herein.

According to further features in the described preferred embodiments, the differential ($F_{base}-F_{reclosable}$) is at least 0.25 N/inch, at least 0.5 N/inch, at least 1 N/inch, at least 2 N/inch, at least 3 N/inch, at least 5 N/inch, at least 7 N/inch, at least 10 N/inch, or at least 15 N/inch.

According to still further features in the described preferred embodiments, the reclosable adhesive attachment includes a pressure-sensitive adhesive (PSA).

According to still further features in the described preferred embodiments, the PSA is disposed on a surface of the reclosable sealing arrangement.

According to still further features in the described preferred embodiments, the PSA is disposed on the second surface of the interfacial arrangement.

According to still further features in the described preferred embodiments, the interfacial arrangement includes at least one sheet of a first thermoplastic polymer.

According to still further features in the described preferred embodiments, the first thermoplastic polymer consists mainly, essentially, or substantially of polyethylene terephthalate (PET).

According to still further features in the described preferred embodiments, the sheet is selected to exhibit thermal stability at a temperature of at least 150° C., at least 160° C., at least 170° C., at least 175° C., or at least 180° C.

According to still further features in the described preferred embodiments, the first surface of the interfacial arrangement includes an amorphous PET.

According to still further features in the described preferred embodiments, the reclosable sealing arrangement includes at least one sheet of a second thermoplastic polymer.

According to still further features in the described preferred embodiments, the second thermoplastic polymer consists mainly, essentially or substantially of PET.

According to still further features in the described preferred embodiments, the sealing perimeter consists mainly, essentially, or substantially of a material selected from the group consisting of PET, polypropylene (PP), polystyrene (PS), and polyethylene (PE).

According to still further features in the described preferred embodiments, the sealing perimeter consists mainly, essentially, or substantially of a material selected to exhibit thermal stability at a temperature of at least 150° C., at least 160° C., at least 170° C., at least 175° C., or at least 180° C.

According to still further features in the described preferred embodiments, the base adhesive attachment is a permanent attachment.

According to still further features in the described preferred embodiments, the cup is further adapted such that in attaining the resealed mode from the open mode, the reclosable sealing arrangement is adapted to contact the second surface of the interfacial arrangement along the sealing perimeter, and to adhere thereto.

According to still further features in the described preferred embodiments, the reclosable adhesive attachment includes a PSA.

According to still further features in the described preferred embodiments, an average width (W) of the first portion of the interfacial arrangement, between an interior edge of the sealing perimeter and an interior edge of the first portion, is at least 5 mm.

According to still further features in the described preferred embodiments, the average width is at least 7 mm, at least 8 mm, at least 10 mm, at least 12 mm, at least 15 mm, or at least 20 mm.

According to still further features in the described preferred embodiments, the dimensionless ratio of $W_{max}$ to $W_{web}$ is at least 0.25, at least 0.3, at least 0.35, at least 0.4, at least 0.45, at least 0.5, at least 0.55, at least 0.6, at least 0.65, at least 0.7, at least 0.75, or at least 0.8.

According to still further features in the described preferred embodiments, the cut curve spans an arc corresponding to an angle of at least 210°, at least 225°, at least 240°, at least 255°, at least 270°, at least 280°, at least 290°, at least 300°, at least 310°, at least 320°, or at least 330°.

According to still further features in the described preferred embodiments, the polymer layers, the pressure-sensitive adhesive, and the sealing perimeter are selected and/or adapted to exhibit thermal stability at a temperature of at least 160° C., at least 170° C., at least 175° C., or at least 180° C., and typically, at most 270°, at most 250°, at most 240°, at most 230°, at most 220°, at most 210°, at most 200° or at most 190°.

According to still further features in the described preferred embodiments, the bottom surface of the second thermoplastic polymer layer includes an amorphous PET.

According to still further features in the described preferred embodiments, the second thermoplastic polymer layer consists mainly of, consisting essentially of, or consisting of PET.

According to still further features in the described preferred embodiments, the first thermoplastic polymer layer includes, consists mainly or essentially of, or consists of PET.

According to still further features in the described preferred embodiments, the PSA is a hot-melt acrylic PSA.

According to still further features in the described preferred embodiments, the hot-melt acrylic PSA is an ultraviolet (UV) curable hot-melt acrylic PSA.

According to still further features in the described preferred embodiments, the cut curve ends in at least one stopper.

According to still further features in the described preferred embodiments, the cut curve ends in a stopper region, the stopper region including a stopper axis spanning between ends of the cut curve, the stopper region limiting the arc to an angle of at most 350°, at most 340°, at most 335°, at most 330°, at most 325°, at most 320°, at most 315°, at most 310°, at most 305°, or at most 300°.

According to still further features in the described preferred embodiments, the multi-layer web further includes an edge cut disposed in the second thermoplastic polymer layer, external to the enclosed portion of the image set.

According to still further features in the described preferred embodiments, a minimum distance between the edge cut and the cut curve is 8 mm, 10 mm, 12 mm, or 15 mm.

According to still further features in the described preferred embodiments, a longitudinal orientation of the edge cut is within 35°, within 25°, within 15°, within 10°, within 7°, or within 5° of parallel with respect to the stopper axis.

According to still further features in the described preferred embodiments, a total thickness of the image set is at least 40 micrometers (μm), at least 50 μm, at least 60 μm, at least 70 μm, or at least 80 μm.

According to still further features in the described preferred embodiments, the total thickness is at most 250 μm, at most 225 μm, at most 200 μm, at most 180 μm, at most 160 μm, at most 150 μm, at most 140 μm, at most 130 μm, at most 120 μm, at most 110 μm, at most 100 μm, at most 90 μm, or at most 80 μm.

According to still further features in the described preferred embodiments, a thickness of the second thermoplastic polymer layer is at least 12 micrometers, at least 15 μm, at least 20 μm, at least 25 μm, or at least 30 μm.

According to still further features in the described preferred embodiments, the thickness of the second thermoplastic polymer layer is at most 100 μm, at most 90 μm, at most 80 μm, at most 70 μm, at most 60 μm, or at most 50 μm.

According to still further features in the described preferred embodiments, a thickness of the first thermoplastic polymer layer is at least 12 μm, at least 15 μm, at least 20 μm, at least 25 μm, or at least 30 μm.

According to still further features in the described preferred embodiments, the thickness of the first thermoplastic polymer layer is at most 150 μm, at most 120 μm, at most 100 μm, at most 90 μm, at most 80 μm, at most 70 μm, at most 60 μm, or at most 50 μm.

According to still further features in the described preferred embodiments, a thickness of the adhesive layer is at least 6 μm, at least 8 μm, at least 10 μm, at least 12 μm, or at least 15 μm.

According to still further features in the described preferred embodiments, the thickness of the adhesive layer is at most 40 μm, at most 35 μm, at most 30 μm, at most 22 μm, or at most 20 μm.

According to still further features in the described preferred embodiments, a release layer including silicone is disposed between the adhesive layer and the top surface of the second thermoplastic polymer layer.

According to still further features in the described preferred embodiments, a penetration of the cut curve into the web is via the bottom surface of the second thermoplastic polymer layer, and the penetration ends below the first thermoplastic polymer layer.

According to still further features in the described preferred embodiments, the penetration ends within the adhesive layer.

According to still further features in the described preferred embodiments, the bottom surface of the second thermoplastic polymer layer includes PE.

According to still further features in the described preferred embodiments, the bottom surface of the second thermoplastic polymer layer includes a heat-sealable lacquer.

According to still further features in the described preferred embodiments, the bottom surface of the second thermoplastic polymer layer includes a heat-sealable primer.

According to still further features in the described preferred embodiments, the heat-sealing is performed at a temperature of at least 130° C., at least 140° C., at least 150° C., at least 160° C., at least 170° C., at least 175° C., or at least 180° C.

According to still further features in the described preferred embodiments, the heat-sealing is performed at a temperature of at most 250° C., at most 240° C., at most 230° C., at most 220° C., at most 210° C., at most 200° C., or at most 190° C.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

The principles and operation of the structures and methods of the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
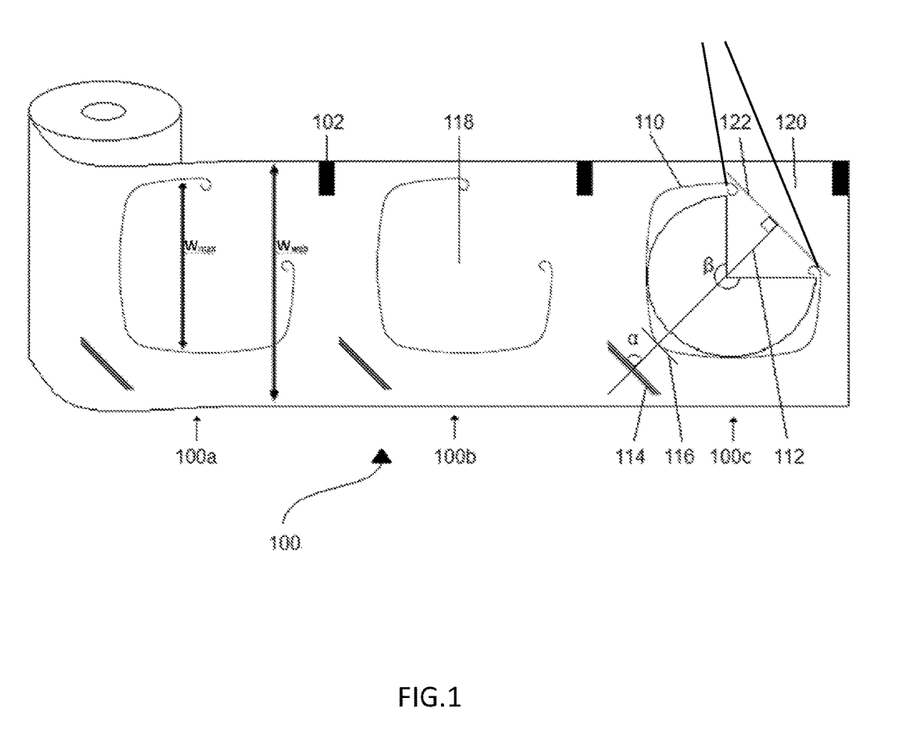
FIG. 1 is a multi-layered polymeric web, according to one aspect of the present invention.

Referring now to the drawings, FIG. 1 is a multi-layered polymeric web 100, according to one aspect of the present invention. Web 100 includes a plurality of image sets such as image set 100a, 100b, 100c.

Figure 2:
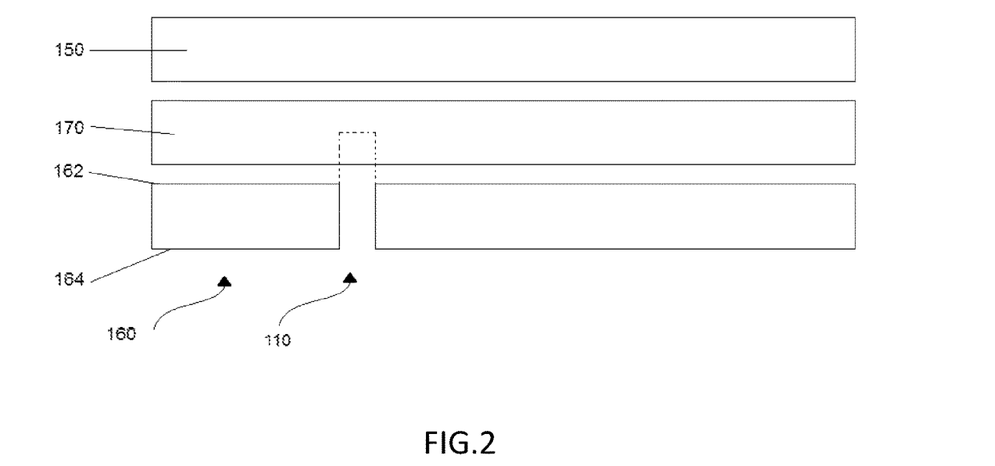
FIG. 2 provides a schematic, cross-sectional, exploded view of an exemplary image set, according to some embodiments of the present invention.

A schematic, cross-sectional, exploded view of such an image set is provided in FIG. 2. Each image set of the web may include a first thermoplastic polymer layer 150, a second thermoplastic polymer layer 160 and an adhesive layer 170, typically including a pressure-sensitive adhesive, interdisposed between first and second thermoplastic polymer layers 150, 160. Typically, first and second thermoplastic polymer layers 150, 160 have an identical width and an identical length.

First thermoplastic polymer layer 150 is laminated to a top surface 162 of second thermoplastic polymer layer 160 by means of adhesive layer 170.

At least one cut curve 110 is formed in second thermoplastic polymer layer 160, typically from a bottom surface 164 thereof. Cut curve 110 may end within second thermoplastic polymer layer 160, or may extend upward, ending within adhesive layer 170.

Figure 3A:
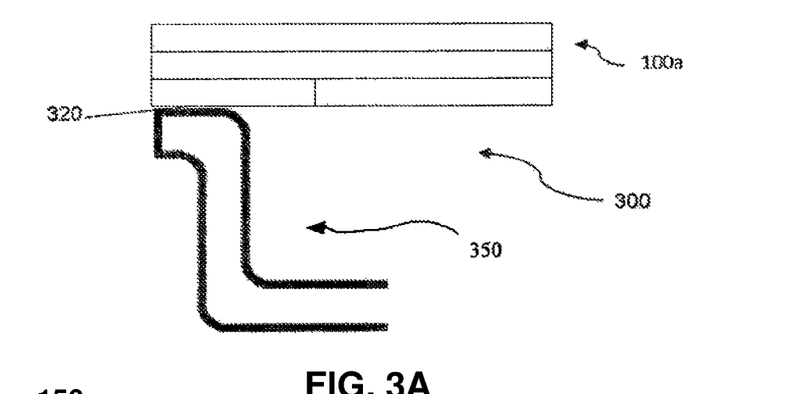
FIG. 3A provides a partial schematic, cross-sectional view of a portion of an inventive resealable cup, in which an image set is bonded to a sealing perimeter thereof, in an initial mode.

Bottom surface 164 of second thermoplastic polymer layer 160 may be adapted to be heat-welded to a thermoplastic sealing rim of a cup (shown in FIG. 3). Thermoplastic polymer layers 150, 160, adhesive layer 170, and the sealing perimeter of the cup are preferably selected and/or adapted to exhibit thermal stability (so as to withstand heat-sealing) at a temperature of at least 130° C., at least 140° C., or at least 150° C., and often, at a temperature of at least 160° C., 170° C., 175° C., or 180° C.

Figure 2A:
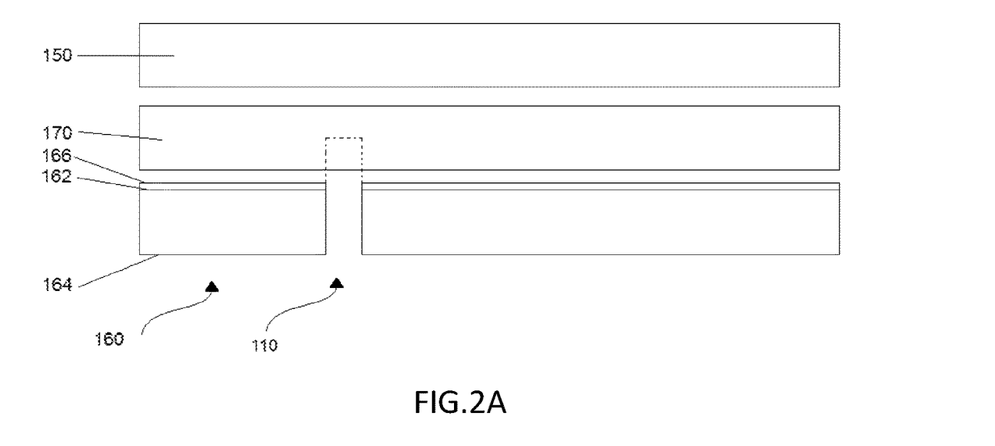
FIG. 2A provides a schematic, cross-sectional, exploded view of an exemplary image set having a release layer, according to some embodiments of the present invention.

In some embodiments, and as shown in FIG. 2A, top surface 162 of second thermoplastic polymer layer 160 may be coated with a release layer 166, typically including, consisting essentially of, or consisting of silicone.

Cut curve 110 may end within second thermoplastic polymer layer 160, or may extend upward, at least partially into release layer 166, or completely through release layer 166, ending within adhesive layer 170.

Referring back to FIG. 1, each image set 100a, 100b, 100c may include at least one eye mark 102 for positioning of the image set. As shown in image set 100c, the image set includes at least one cut curve 110 forming a weakened region in second thermoplastic polymer layer 160. Cut curve 110 may span an arc corresponding to an angle β of at least 200°, so as to enclose an enclosed portion (shown as 118 in image set 100b) of the image set.

In some embodiments, cut curve 110 ends in at least one stopper region 120 containing at least one stopper such as stoppers 125. Stoppers 125 may define a stopper axis 122 spanning between ends of cut curve 110. The stoppers or stopper region may limit the arc of cut curve 110 to an angle of at most 350°, at most 340°, at most 335°, at most 330°, at most 325°, at most 320°, at most 315°, at most 310°, at most 305°, or at most 300°.

In some embodiments, each image set may further include an edge cut 114 disposed in the second thermoplastic polymer layer (in similar fashion to cut curve 110), and external to enclosed portion 118 of the image set. A minimum distance between edge cut 114 and cut curve 110, identified as a distance between edge cut 114 and a line 116 tangential to cut curve 110, may be 8 mm, 10 mm, 12 mm, or 15 mm.

In addition, a longitudinal orientation of edge cut 114, defined by angle α, may be within 35°, within 25°, within 15°, and more typically, within 10°, within 7°, or within 5° of parallel with respect to stopper axis 122. As seen, angle α is defined between edge cut 114 and a line 112 perpendicular to stopper axis 122.

Each image set has a width that is typically equal to the width of the web ($W_{web}$) along a broad face of the web, and transverse to a long dimension of the web. Enclosed portion 118 has a maximum width $W_{max}$ transverse to the long dimension of the web. In some embodiments of the present invention, a dimensionless ratio of $W_{max}$ to $W_{web}$ is at least 0.2, at least 0.25, at least 0.3, at least 0.35, at least 0.4, at least 0.45, at least 0.5, at least 0.55, at least 0.6, at least 0.65, at least 0.7, at least 0.75, or at least 0.8.

FIG. 3A provides a schematic, partial cross-sectional view of a portion of an inventive resealable cup 300, in which an image set 100a, or at least a major portion of an image set, is bonded to a sealing perimeter 320 of a cup body 350 to form a base adhesive attachment. Cup 300 is shown in an initial mode, prior to opening the reclosable lid.

Figure 3B:
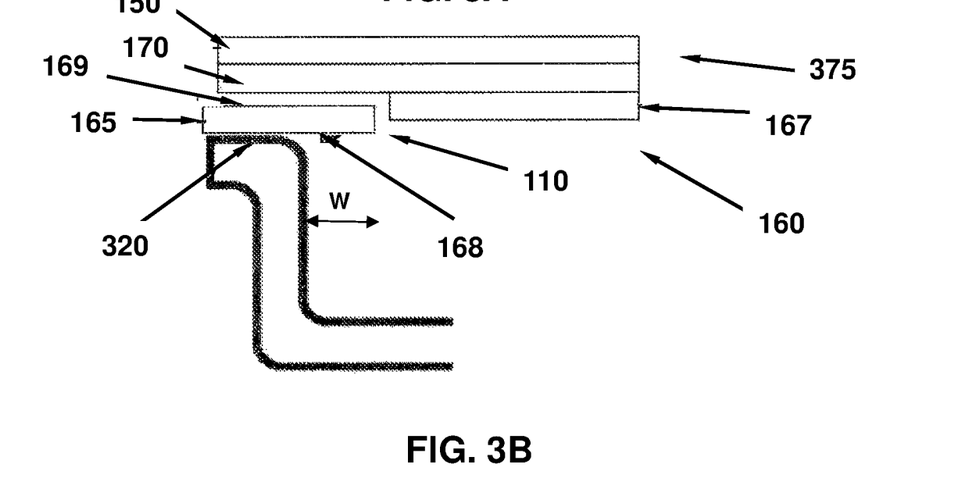
FIG. 3B provides a partial schematic, cross-sectional view of the resealable cup of FIG. 3A, in which the seal has been opened.

FIG. 3B provides a partial schematic, cross-sectional view of resealable cup 300 of FIG. 3A, in which a reclosable lid or sealably reclosable sealing arrangement 375 is disposed in an open position. It will be appreciated that as reclosable lid 375 is lifted for the first time, a break occurs along cut curve 110. An exterior portion (also termed "interfacial arrangement") 165 of the second (bottom) thermoplastic polymer layer 160, which has formed a relatively strong base adhesive attachment with sealing perimeter 320, remains attached to sealing perimeter 320, while an interior portion 167 of this thermoplastic polymer layer, which is adhesively attached to first (top) layer 150 by means of PSA layer 170, remains attached to top layer 150 and forms a portion of reclosable lid 375.

Interfacial arrangement 165 may be interdisposed between sealing perimeter 320 and reclosable sealing arrangement 375. Interfacial arrangement 165 has a first surface 168 disposed towards, and forming a base adhesive attachment with, sealing perimeter 320, and a second surface 169, distal to first surface 168, disposed generally towards reclosable arrangement 375, and forming a reclosable adhesive attachment therewith. The base adhesive attachment exhibits a base peeling force ($F_{base}$), while the reclosable adhesive attachment exhibits a reclosable peeling force ($F_{reclosable}$). A differential between the base peeling force and the reclosable peeling force ($F_{base}-F_{reclosable}$) is at least 0.1 Newtons/inch (N/inch), at least 0.25 N/inch, at least 0.5 N/inch, or at least 1 N/inch, and more typically, at least 2 N/inch, at least 3 N/inch, at least 5 N/inch, at least 7 N/inch, at least 10 N/inch, or at least 15 N/inch.

It will be readily appreciated by those of ordinary skill in the art that the absolute adhesive attachment strengths, and the resulting differential adhesive attachment strength, may be determined using various peeling procedures recognized as standard in the art. While various recognized standard procedures may provide highly similar results, as used herein in the specification and in the claims section that follows, the term "peeling force", and the like, e.g., with respect to an adhesive attachment, refers to the peeling force as measured by test procedure FTM 1 of FINAT (Federation Internationale des Fabricants et Transformateurs d'Adhesifs et Thermocollants sur Papiers et Autres Supports) is provided below:

FTM 1-Peel Adhesion (180°) at 300 mm Per Minute

This test method quantifies the permanence of adhesion or peelability of self-adhesive pressure sensitive materials. Peel adhesion is the force required to remove pressure sensitive coated material, which has been applied to a standard test plate under specified conditions from the plate at a specified angle and speed.

Test strips should be 25 mm wide and have a minimum length of 175 mm in the machine direction.

Remove the backing material from each strip and place the adhesive coated facing material, adhesive side down, on to a clean test plate using light finger pressure and follow sample preparation procedures.

Fix the test plate and strip in the machine so that the angle of peel is 180°. Set the machine at 300 mm per minute jaw separation rate. Set the machine load averaging function so that it averages data—taking more than five readings at 10 mm intervals from the centre section of each test strip and averaging them.

Peel adhesion (180°) is the average result for the strips tested in Newtons per 25 mm width, or in Newtons per inch width, which is substantially identical.

With reference again to FIG. 3B, a width or an average width (W) of the first portion of the interfacial arrangement, between an interior edge of sealing perimeter 320 (or an interior wall of cup body 350 proximate to sealing perimeter 320) and an interior edge of exterior portion 165 of the second or bottom thermoplastic polymer layer 160, may, in some embodiments, be at least 5 mm, at least 7 mm, at least 8 mm, at least 10 mm, at least 12 mm, at least 15 mm, or at least 20 mm, and typically, at most 35 mm or at most 30 mm. The average width is a linear average taken along the entire sealing perimeter.

Figure 3C:
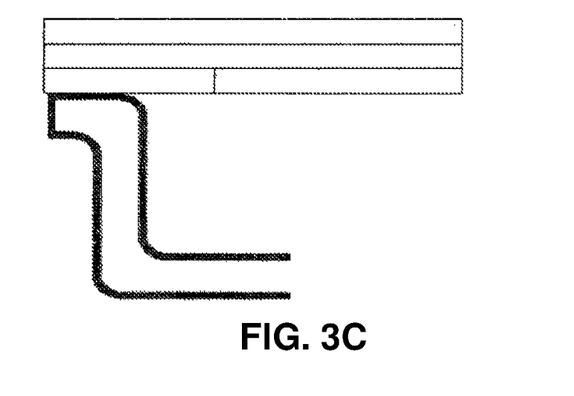
FIG. 3C provides a partial schematic, cross-sectional view of the resealable cup of FIGS. 3A and 3B, after resealing.

FIG. 3C provides a partial schematic, cross-sectional view of the resealable cup of FIGS. 3A and 3B, after resealing. The resealed cup may have a sealed arrangement that is similar to, or identical to, the initial sealed arrangement shown in FIG. 3A.

In some embodiments of the present invention, the production and sealing of the lid may be carried out as follows: the web is pulled or drawn to effect motion of the image sets along a longitudinal plane; a particular image set of the image sets is aligned, during this motion, with a particular cup body; a sealing region within the particular image set is heat-sealed to a sealing perimeter on the cup body; and the excess portion of the particular image set is cut off an around the sealing perimeter.

Optionally, an image may be printed according to customer demand or design. Otherwise, printing may be performed solely for the purpose of producing an eye mark. Such an eye mark may be essential for positioning of the image set to accurately perform the cutting of the image set (e.g., by die cutting or laser cutting). The eye mark may be essential for positioning of the image set during application and heat-sealing on the cup.

The printing may be performed internally, on the upper side of the second thermoplastic polymer layer, and/or on the bottom side of the first thermoplastic polymer layer. Alternatively or additionally, the printing may be performed externally, e.g., on the upper side of the first thermoplastic polymer layer.

The preprinted film may be laminated to the other film by means of PSA adhesive. The lamination process may be performed on a particular type of converting machine that is known to those of ordinary skill in the art.

In a first step, a release layer (typically silicone) may be applied. Subsequently, in a second step, a layer of PSA adhesive may be applied to the release layer. In a third step, an additional thermoplastic polymeric layer is introduced on top of the adhesive layer to produce a multi-layered web including polymeric film layers having a PSA adhesive layer disposed in-between.

The multi-layered web may be passed through a cutting station, in which the bottom polymeric layer is cut (e.g., by die cutting or laser cutting) in a pre-determined fashion, according to the type and size of the cup, and according to the specific function of the cup. Typically, the upper polymeric layer is left completely intact.

The reel may be transferred to a slitting inspection machine for pre-determined edge trimming and winding, typically according to customer requirements.

The lid having a reclosable sealing arrangement may include at least three main layers, as shown in FIGS. 2-2A, and FIGS. 3A-3C, and described hereinabove. After heat-sealing all three of the layers to the cup, these layers may be punched by a serrated die, which provides a serrated edge to the lid.

As used herein in the specification and in the claims section that follows, the term "percent", or "%", refers to percent by weight, unless specifically indicated otherwise.

As used herein in the specification and in the claims section that follows, the term "mainly", with respect to a composition, refers to a weight basis, unless specifically indicated otherwise.

As used herein in the specification and in the claims section that follows, the units of peeling force of an adhesive attachment and the like, measured in Newtons/inch (or N/inch), refer to Newtons per inch width of the test strip.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims

What is claimed is:

1. A reclosably sealed cup, comprising:
    (a) a cup having a sealing perimeter and a central cavity, said cavity circumscribed by an interior edge of said sealing perimeter; and
    (b) a lid, including:
        (i) a reclosable sealing arrangement, associated with said sealing perimeter of said cup, said lid adapted to reclosably cover said cup, said reclosable sealing arrangement adapted to reclosably seal said cup along said sealing perimeter; and
        (ii) an interfacial arrangement, interdisposed between said sealing perimeter and said reclosable sealing arrangement,
    said interfacial arrangement having a first surface disposed towards, and forming a base adhesive attachment with, said sealing perimeter, and a second surface, distal to said first surface, disposed towards said reclosable sealing arrangement, and forming a reclosable adhesive attachment therewith,
    said reclosable sealing arrangement having an initial sealed mode, an open mode, and a resealed mode;
    said interfacial arrangement having a pre-determined weak region adapted such that in attaining said open mode from said initial sealed mode, said interfacial arrangement of said lid is broken along said pre-determined weak region, such that:
        a first portion of said interfacial arrangement of said lid, exterior to said weak region and extending beyond said interior edge of said sealing perimeter into said cavity, remains attached to said sealing perimeter of said cup via said base adhesive attachment; and
        a second portion of said interfacial arrangement of said lid, interior to said weak region, is released from said base adhesive attachment with said sealing perimeter of said cup while remaining attached to said reclosable sealing arrangement of said lid,
    wherein an average width (W) of said first portion of said interfacial arrangement, between said interior edge of said sealing perimeter of said cup and an interior edge of said first portion disposed within said cavity, is within a range of 5 mm to 35 mm.

2. The reclosably sealed cup of claim 1, further adapted such that in attaining said resealed mode from said open mode, said reclosable sealing arrangement is adapted to contact said second surface of said interfacial arrangement along said sealing perimeter, and to adhere thereto.

3. The reclosably sealed cup of claim 2, said reclosable adhesive attachment including a pressure-sensitive adhesive.

4. The reclosably sealed cup of claim 3, said pressure-sensitive adhesive being disposed on a surface of said reclosable sealing arrangement.

5. The reclosably sealed cup of claim 3, said pressure-sensitive adhesive being disposed on said second surface of said interfacial arrangement.

6. The reclosably sealed cup of claim 2, said base adhesive attachment exhibiting a base peeling force ($F_{base}$),
    said reclosable adhesive attachment exhibiting a reclosable peeling force ($F_{reclosable}$), wherein a differential between said base peeling force and said reclosable peeling force ($F_{base}-F_{reclosable}$) is at least 0.1 N/inch.

7. The reclosably sealed cup of claim 6, said differential being at least 0.5 N/inch.

8. The reclosably sealed cup of claim 1, said average width being at least 7 mm.

9. The reclosably sealed cup of claim 1, said interfacial arrangement including at least one sheet of a first thermoplastic polymer.

10. The reclosably sealed cup of claim 9, said first thermoplastic polymer consisting mainly of polyethylene terephthalate (PET).

11. The reclosably sealed cup of claim 9, said at least one sheet of said first thermoplastic polymer selected to exhibit thermal stability at a temperature of at least 150° C.

12. The reclosably sealed cup of claim 9, said first surface of said interfacial arrangement including an amorphous polyethylene terephthalate.

13. The reclosably sealed cup of claim 9, said reclosable sealing arrangement including at least one sheet of a second thermoplastic polymer.

14. The reclosably sealed cup of claim 13, said second thermoplastic polymer consisting mainly of polyethylene terephthalate (PET).

15. The reclosably sealed cup of claim 1, said sealing perimeter consisting mainly of a material selected from the group consisting of polyethylene terephthalate (PET), polypropylene (PP), polystyrene (PS), and polyethylene (PE).

16. The reclosably sealed cup of claim 1, said sealing perimeter consisting mainly of a material selected to exhibit thermal stability at a temperature of at least 170° C.

17. The reclosably sealed cup of claim 1, said base adhesive attachment being a permanent attachment.

18. A reclosably sealed cup, comprising:
(a) a cup having a sealing perimeter and a central cavity, said cavity circumscribed by an interior edge of said sealing perimeter; and
(b) a lid having:
(i) a reclosable sealing arrangement, associated with said sealing perimeter of said cup, said lid adapted to reclosably cover said cup, said reclosable sealing arrangement adapted to reclosably seal said cup along said sealing perimeter; and
(ii) an interfacial arrangement, interdisposed between said sealing perimeter and said reclosable sealing arrangement,
said interfacial arrangement having a first surface disposed towards, and forming a base adhesive attachment with, said sealing perimeter, and a second surface, distal to said first surface, disposed towards said reclosable sealing arrangement, and forming a reclosable adhesive attachment therewith, said reclosable adhesive arrangement including a pressure-sensitive adhesive,
said reclosable sealing arrangement having an initial sealed mode, an open mode, and a resealed mode;
said interfacial arrangement having a pre-determined weak region adapted such that in attaining said open mode from said initial sealed mode, said interfacial arrangement of said lid is broken along said pre-determined weak region, such that:
a first portion of said interfacial arrangement of said lid, exterior to said weak region and extending beyond said interior edge of said sealing perimeter into said cavity, remains attached to said sealing perimeter of said cup via said base adhesive attachment; and
a second portion of said interfacial arrangement of said lid, interior to said weak region, is released from said base adhesive attachment with said sealing perimeter of said cup while remaining attached to said reclosable sealing arrangement of said lid;
wherein, in attaining said resealed mode from said open mode, said reclosable sealing arrangement is adapted to directly contact said second surface of said interfacial arrangement along said sealing perimeter, and to adhere thereto, and
wherein an average width (W) of said first portion of said interfacial arrangement, between said interior edge of said sealing perimeter of said cup and an interior edge of said first portion disposed within said cavity, is within a range of 5 mm to 30 mm.

19. The reclosably sealed cup of claim 18, said average width being at least 7 mm.

* * * * *